Patented Mar. 13, 1951

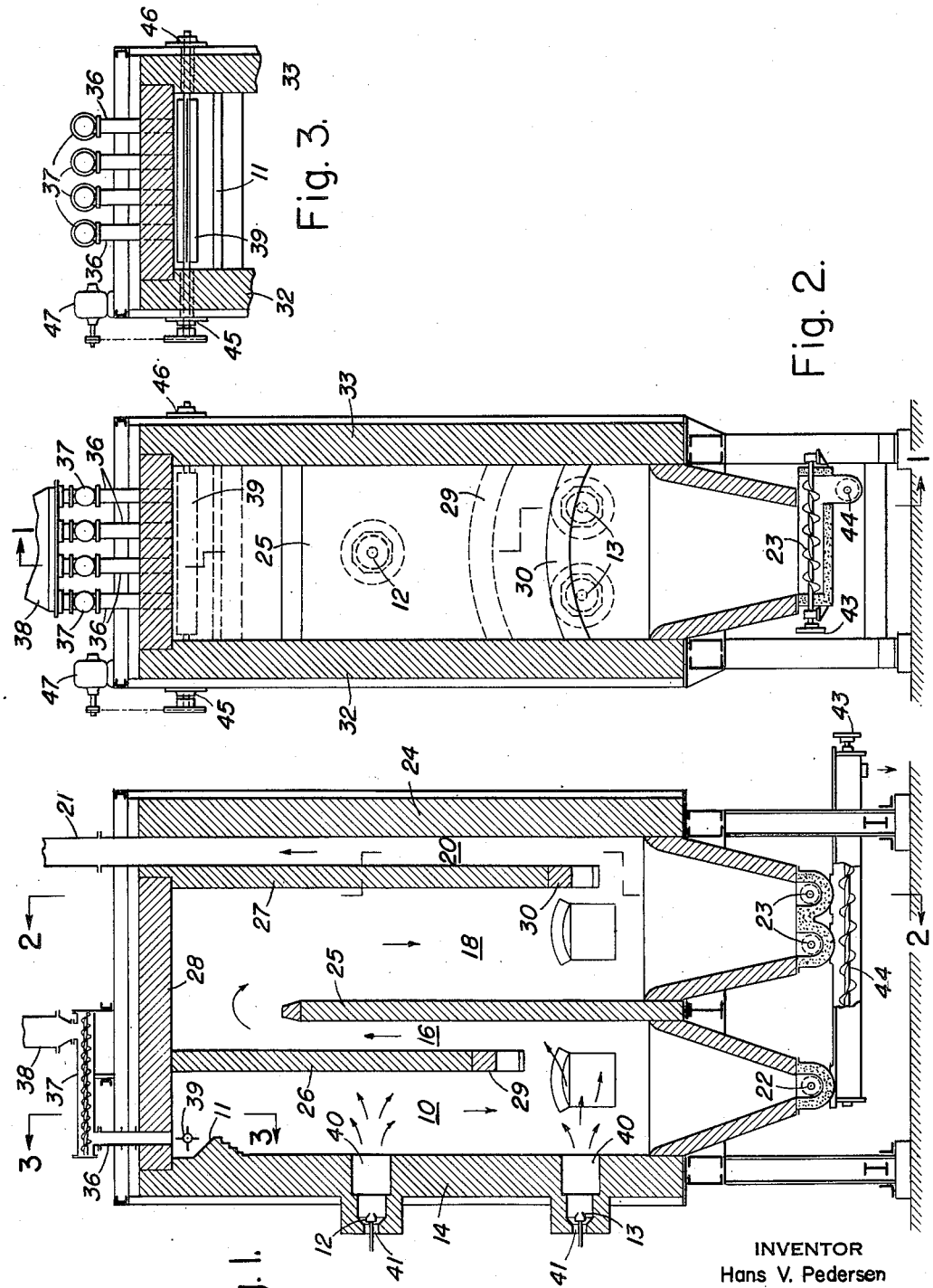

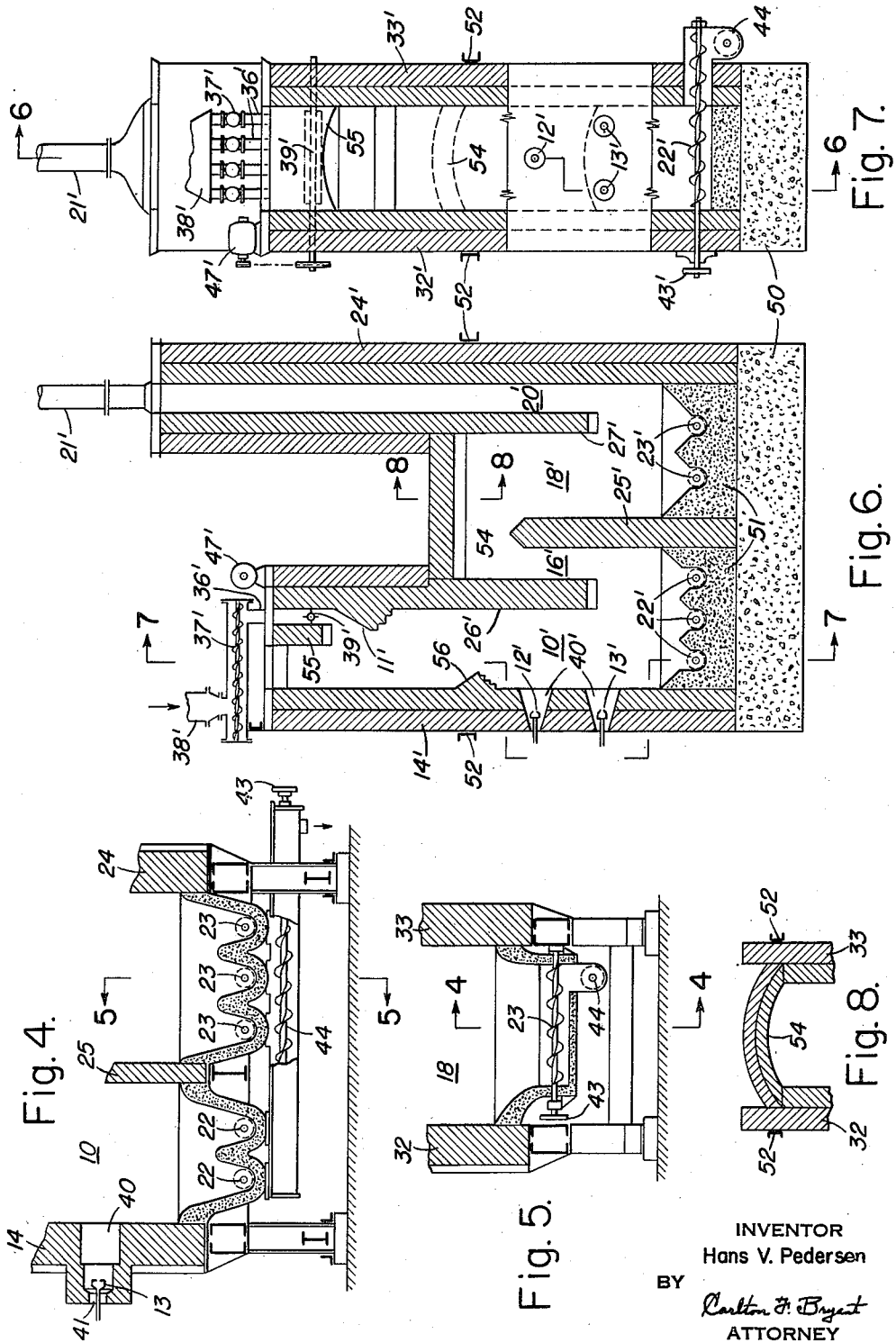

2,545,410

UNITED STATES PATENT OFFICE 2,545,410

FLASH CALCINING FURNACE

Hans V. Pedersen, Marshalltown, Iowa, assignor to Combustion Engineering-Superheater, Inc., a corporation of Delaware Application July 10, 1947, Serial No. 760,009

3 Claims. (Cl. 263—39)

My invention relates to furnaces for calcining materials such as dried waste sludge which results from the softening of water by the lime process and which contains calcium carbonate as a principal ingredient.

Broadly stated, the object of my invention is to improve the design and extend the usefulness of furnaces for "flash" calcining dried calcium-carbonate sludge (to calcium oxide) and other materials susceptible to like treatment, whereby to convert those materials into products which can be used over again in the processes (such as reuse of reclaimed calcium oxide in the water softening process) wherein the materials were originally employed.

A more specific object is to provide improved furnaces capable of continuously receiving the material to be calcined, of so distributing same with respect to the furnace flame as to secure a maximum of efficiency in the calcining process, and of continuously discharging the calcined material from the furnace bottom.

Another object is to increase the effectiveness with which pre-heated calcium carbonate or other incoming material enters and diffuses through the flame stream.

With these and other objects in view, my invention consists in the construction, arrangement and combination of furnace parts whereby the objects contemplated are attained, as hereinafter more fully set forth, pointed out in my claims and illustrated in the accompanying drawings wherein:

Figure 1 is a longitudinal cross section in elevation, taken on line 1—1 of Figure 2, through a flash calcining furnace that embodies my inventive improvements;

Figure 2 is a transverse section through the furnace of Figure 1 taken on line 2—2 thereof;

Figure 3 is a section taken on line 3—3 of Figure 1 to show the incoming material agitator in greater detail;

Figures 4 and 5 represent a modified bottom construction for the furnace of Figures 1 and 2;

Figure 6 is a longitudinal cross section in elevation, taken on line 6—6 of Figure 7, through a second design of calcining furnace that incorporates my inventive improvements;

Figure 7 is a transverse section through the furnace of Figure 6 taken on line 7—7 thereof; and Figure 8 is a section taken on line 8—8 of Figure 6 to show the arched construction of the furnace roof.

*The improved furnace of Figures 1—2—3*

In the illustrative construction shown by Figs. 1—2—3, the calcining furnace of my invention comprises a combustion chamber 10 having in its upper portion an inclined spreader surface 11 upon which pre-dried material to be calcined is dropped, upper and lower burners 12 and 13 in its front wall 14 to provide the heat necessary for calcining, and a bottom (illustratively shown as of the hopper type) for collecting material calcined by that heat; a riser passage 16 through which the gaseous products of combustion flow upwardly from the lower portion of chamber 10; a separation chamber 18 through which those gaseous products then pass downwardly to drop out into a second bottom (also shown as a hopper) finely divided calcined material carried in suspension therein; and a stack or flue passage 20 through which the combustion gases thereafter pass upwardly for discharge from the furnace by way of flue 21. The furnace further comprises screw conveyors 22 and 23 for removing the calcined material from the represented hopper bottoms of combustion and separator chambers 10 and 18, as will later be described.

The furnace chambers and passages named may satisfactorily be formed by building a substantially rectangular structure from fire brick or the like (although none of the walls are here shown as to brick detail), and by interposing between the front wall 14 and the rear wall 24 of this structure a partition wall 25 which extends upwardly from the furnace bottom with its top spaced from the furnace roof as shown, and other partition walls 26 and 27 which extend downwardly from the furnace roof 28 and with their lower edges spaced from the furnace bottom and constituted of supporting arches 29 and 30. Side walls 32 and 33 (shown in Fig. 2) complete the furnace enclosure.

Provision for continuously feeding the material to be calcined into the top of the furnace includes a plurality of feed tubes 36 which enter the top front of combustion chamber 10 and each of which extends downwardly from the discharge end of a horizontal screw conveyor 37. These conveyors 37 may be driven in any suitable manner such as by an electric motor (not shown). They are fed with the dried calcium carbonate (or other material) flowing downwardly thereinto by gravity from a supply manifold or hopper 38 connected therewith. The horizontal portions of the conveyors become filled with the calcium material and thereby effect a seal for the represented feeding means that lead into the upper combustion chamber portion.

Positioned directly beneath the feed tubes 36 is the spreader surface 11 which slopes downwardly and inwardly toward the combustion chamber center. This surface may consist of a plate (though not here indicated) of a heat and wear resisting material polished smooth on its upper side. Its purpose is to spread the incoming calcium material, dropping thereon from tubes 36, fanwise so that the granular particles of same descend into chamber 10 separated from each other and distributed with substantial uniformity across the area of chamber cross section.

When the incoming material to be calcined enters the furnace in pre-heated condition (as in the "Flash Drying and Calcining System" of U. S. Patent 2,505,617, issued to Charles W. Gordon on April 25, 1950, from an application filed on July 10, 1947), I have discovered that an effective spreading of this material across the chamber area requires the use of supplemental agitator means such as are represented at 39 in Figs. 1—2—3. This agitator 39 may satisfactorily comprise the represented central shaft having external lengthwise vanes mounted therearound (as best indicated by Fig. 1).

Bearings 45—46 in the furnace side walls support this vane-carrying shaft in a manner permitting rotation. During furnace operation the shaft and vanes are rotated at some suitable speed (as about 300 R. P. M.) by a motor 47 or other suitable means. If desired (though not here shown) this agitator 39 may be water cooled by making the shaft thereof tubular and by passing water therethrough.

The pre-heated calcium carbonate or other material entering the furnace through feed tubes 36 is not freely granular (as when un-preheated) but the particles thereof seem to be mutually adherent and in many cases the material behaves much as a liquid. Upon striking the whirling agitator 39 this liquid-like material is broken up and dispersed in a way assuring effective spreading (aided by sloping surface 11) with substantial uniformity across the area of chamber 10's cross section.

In my improved furnace of Figs. 1—2—3 the heat-producing flames needed to effect calcining originate at burner nozzles 12 and/or 13 and enter the combustion chamber 10 through front wall openings 40. Those burner nozzles, mounted as shown at the opening 40 entrances, may be of conventional design suitable for receiving oil or other fuel under pressure. Air necessary for supporting combustion enters through spaces 41 around the burner fuel tubes, or may be introduced into the combustion chamber under pressure if desired.

Flame from the upper burner 12 baffles against partition 26 to spread through combustion chamber 10, and then passes downwardly to join the flame from lower burners 13 if in use; and thereafter passes upwardly through riser passage 16. The calcium carbonate or other material in predried and preferably preheated form sifting down (from agitator 39 and spreader surface 11) through these flames is by them subjected to high temperatures (of the order of 2000° F.) which drive off the carbon dioxide.

By this calcining the material introduced through tubes 36 is converted back into a product which can be employed over again in the process where originally used. In the case of water softening, the hard water is treated in a reservoir with calcium hydrate which combines with carbonic acid in the bicarbonates present in the water to form the insoluble carbonates which precipitate. The resulting sludge deposit is then treated, as in a centrifuge, to be concentrated into a cake which contains substantially only calcium carbonate. Passage through my furnace of dried sludge containing the precipitated calcium carbonate converts it into calcium oxide which is capable of being used over again in the water softening process. This converted or calcined product is relatively fine grained in form.

The uncalcined material coming into the furnace through feed tubes 36 is quite fully calcined (carbon dioxide driven off) during passage with the hot gases of combustion downwardly through combustion chamber 10; a portion of the calcined material falls into the furnace bottom beneath this chamber 10 and enters conveyor 22. The remaining calcined material is carried, by the flowing gases due to the draft created by stack 21, upwardly through passage 16 over the top of riser partition 25, thence downwardly through separator chamber 18, and upwardly through flue passage 20. Upon reaching the lower end of partition 27 substantially all of the remaining calcined material falls into conveyors 23 in the bottom structure beneath chamber 18.

The named conveyors 22 and 23, serve to remove the calcined material from the furnace and to seal the bottoms of combustion and separation chambers 10 and 18. They are of the screw type illustrated; each may if desired (though not shown here) be water cooled by making the shaft thereof tubular and passing water therethrough; and all are suitably driven, as through sprocket wheels 43 and a chain belt (not shown), by an electric motor (also not shown), or other conventional means. In the arrangement here illustrated, these conveyors 22—23 discharge their contents into a cross conveyor 44 which may extend to a storage bin (not shown) or other receiver of the calcined material that is thus continuously brought out of the furnace.

The carbon dioxide liberated from the treated material and other gaseous products of furnace combustion are discharged from the furnace by way of flue passage 20 and stack 21 communicating therewith. If desired (though not shown here), a portion or all of these hot gases leaving the furnace may be usefully applied for various purposes, such as drying the waste sludge from a water softening plant to thereby condition it for feeding to my calcining furnace. One system for accomplishing the latter purpose is disclosed and claimed by the earlier-mentioned U. S. Patent 2,505,617, issued April 25, 1950, to Charles W. Gordon from an application filed July 10, 1947, for "Flash Drying and Calcining System."

In operation of the improved furnace shown by Figs. 1—2—3, the freshly dried calcium carbonate or other material to be calcined is slowly fed by the conveyors 37 into the tubes 36 from which the material drops by gravity onto the agitator 39 and spreader surface 11 in the top of combustion chamber 10. Impingement with the whirling agitator and this surface spreads the material particles out fan wise for intimate contact with the flame from burner 12 (and/or later from burners 13) as the particles then descend through the combustion chamber. As earlier indicated, either upper burner 12 or lower burners 13 or both may be used. The intense heat of the flame (of the order of 2000° F.) quickly liberates carbon dioxide from the particles thereby calcining the material.

In this furnace of Figs. 1—2—3, a portion (roughly about one-third) of the calcined particles drop out of the flame in combustion chamber 10 to deposit in the chamber bottom from which they are carried out of the furnace by conveyor 22; the rest (roughly about two-thirds) of the calcined particles are carried by the flowing gases (due to the draft created by stack 21) up through riser passage 16 and down into separator chamber 18 from which they settle out into the bottom of that chamber and leave the furnace by way of conveyors 23. It will be remembered that the particles of calcium carbonate thus calcined become calcium oxide so that such material removed by conveyors 22 and 23 is directly useable as a water softening agent.

As earlier stated, the gaseous carbon dioxide liberated during the calcining process is drawn out of the combustion and separation chambers by the draft through the flue passage 20 and into the stack 21.

*Modified furnace bottom of Figs. 4—5*

Referring now to Figs. 4 and 5, these show a modified bottom construction for the furnace of Figs. 1—2—3. The "hopper" form of bottom of those earlier views has been replaced by the more nearly "flat" type of bottom construction which Figs. 4—5 represent. Advantage of the latter lies in reducing a possibility that the calcined material falling out of furnace chambers 10 and 18 may (under certain conditions) "bridge" across the space between hopper walls and thereby fail in proper discharge into conveyors 22 and 23.

*Furnace construction of Figs. 6—7—8*

Looking next at Figs. 6, 7 and 8, these views show an alternative form of calcining furnace design wherein certain further improvements of my invention have been incorporated. A concrete base 50 supports the front, rear and side furnace walls 14', 24', 32' and 33', the partition wall 25' and the furnace bottom 51. Discharge conveyors 22' and 23' extend through upper-surface channels in this bottom in the manner shown.

In the construction illustrated each of the named furnace walls consists of an inner layer of fire brick and an outer layer of ordinary brick, the entire structure being banded at one or more elevations as indicated at 52. Separation chamber 18' as covered by arched roof 54 (see Fig. 8) is of lesser height than is combustion chamber 10', while partitions 26' and 27' extend down from roof 54 to constitute riser and flue passages 16' and 20'. Stack 21' extends upwardly from the latter.

The material to be calcined passes from supply manifold or hopper 38' into screw conveyors 37' which feed it into tubes 36'. Those tubes extend downwardly into the top of combustion chamber 10' between the upper portion of wall 26' and a downcoming feeder partition 55 spaced from that wall as shown. The incoming material then falls upon rotating agitator 39' beneath the feed tubes 36', and is finally broken up by it.

In this condition the material then still further drops down upon a sloping spreader surface 11'. Latter directs the descending material toward the center of combustion chamber 10' causing some of it to strike a second and lower inclined surface 56 constituted by a ledge on the opposite chamber side. These two surfaces, in combination with agitator 39' assure that all incoming material (whether preheated or un-preheated) is thoroughly broken up and distributed with substantial uniformity across the entire area of combustion chamber cross section. Lower surface 56 also shields the burner openings 40' from direct reception of falling material particles.

In this furnace of Figs. 6—7—8, the heat-producing flames needed to effect calcining originate at burner nozzles 12' (upper) and 13' (lower) and enter the combustion chamber 10' through the openings 40' in front wall 14'. Positioning of these burners in the front furnace wall may satisfactorily be about as shown by Figs. 6—7. Oil or other suitable fuel may be used for firing.

The calcium carbonate or other incoming material sifting down (from agitator 39' and spreader surfaces 11' and 56) through the burner flames is by them subjected to high temperatures (of the order of 2000° F.) which drive off the carbon dioxide. By this calcining the introduced material is converted back into a product which can be used over again in the process where originally employed.

Such conversion is rather fully completed during passage of the material with the hot gasses of combustion downwardly through combustion chamber 10' and across the bottom thereof into riser passage 16'. A portion of the thus-calcined material falls onto the furnace bottom beneath this chamber 10' and enters conveyors 22'. The remaining calcined material is carried by the flowing gases due to the draft created by stack 21', upwardly through passage 16' over the top of riser partition 25', thence downwardly through separator chamber 18', and upwardly through flue passage 20'. Upon reaching the lower end of partition 27' substantially all of the remaining calcined material falls into conveyors 23' in the bottom structure beneath chamber 18'.

The named conveyors 22'—23' serve to remove the calcined material from the furnace by discharging same into a cross conveyor 44' which may extend to a storage bin (not shown) or other receiver of the calcined material that is thus continuously brought out of the furnace. The pointed contours (see Fig. 6) of the bottom surfaces between adjacent conveyors assure that all calcined material falling upon the furnace bottom will satisfactorily enter these conveyors.

*Summary*

By incorporating into the calcining furnace the inventive improvements herein disclosed it is possible to secure an exceedingly quick and efficient calcination of materials such as dried calcium carbonate and to secure resultant products which are entirely satisfactory for reuse as water softening or other agents. When the furnace so constructed forms part of a complete system such as that disclosed by aforesaid Gordon Patent 2,505,617 earlier identified, such calcination can, moreover, be practiced with a maximum of material salvage and a minimum of fuel consumption.

From the foregoing it will accordingly be seen that I have improved the design and extended the usefulness of furnaces for flash calcining dried calcium carbonate sludge and other materials susceptible to like treatment; that I have provided improved furnaces capable of continuously receiving the material to be calcined, of so distributing same with respect to the furnace flame as to secure a maximum of efficiency in the calcining process, and of continuously discharging the calcined material from the furnace bottom; and that I have increased the effectiveness with which pre-heated calcium carbonate or other incoming material enters and diffuses through the flame stream.

My inventive improvements are therefore extensive in their adaption and hence are not to be restricted to the specific form here disclosed by way of illustration.

What I claim is:

1. In a furnace for calcining calcium carbonate and like material introduced into the furnace in a preheated state, the combination of a vertical combustion chamber having a gas offtake in its lower portion, burner means at an intermediate chamber level for projecting into said chamber a flame which spreads therethrough and passes downwardly toward said offtake, means at an upper chamber level providing a spreader surface that inclines inwardly and downwardly from one chamber side, an agitator having rotatable vanes positioned in the chamber's upper portion above said spreader surface, means at a still higher chamber level for dropping the said preheated material to be calcined into said agitator and thence upon said spreader surface whereby said material is broken up and diffused through the combustion chamber and carried by gravity downwardly into said flame to be calcined by the heat thereof, a riser passage through which said flame and hot gases therefrom pass upwardly from said combustion chamber offtake, an adjacent separator chamber through which said gases from the riser passage again pass downwardly for subsequent discharge from the furnace; means including a first collector and conveyor at the furnace bottom for removing the calcined material which drops out of said flame and gases in said combustion chamber and riser passage; and means including a second collector and conveyor at the furnace bottom for removing the calcined material which further drops out of said combustion gases as same pass through said separator chamber.

2. In a furnace for calcining calcium carbonate and like material introduced into the furnace in a preheated state, the combination of a vertical combustion chamber, burner means for projecting a flame into and downwardly through said chamber, an agitator including rotatable vanes positioned in the chamber's upper portion adjacent one inner chamber wall, a spreader surface beneath said agitator inclining downwardly and inwardly toward the chamber center, means for feeding material to be calcined into said upper chamber portion so that same impinges against and is thoroughly broken up by said rotating agitator vanes prior to dropping upon said spreader surface which aids in uniformly diffusing the descending material particles into said flame where calcination is effected by the heat thereof, a riser passage communicating with the lower portion of said combustion chamber and serving to conduct the gaseous combustion products upwardly therefrom, and means at the furnace bottom for removing the calcined material particles which drop out of the flame gases during passage of same through the combustion chamber and into said riser passage.

3. In a furnace for calcining calcium carbonate and like material introduced into the furnace in a preheated state, the combination of a vertical combustion chamber, an agitator including rotatable vanes positioned in the chamber's upper portion adjacent one inner chamber wall, a first spreader surface beneath said agitator inclining downwardly and inwardly toward the chamber center, a second spreader surface projecting from the opposite chamber wall at an elevation below that of said first surface and also inclining downwardly and inwardly toward the chamber center, burner means in said opposite chamber wall below and shielded by said second spreader surface for projecting a flame into and downwardly through said chamber, means for feeding the said preheated material to be calcined into said upper chamber portion so that same impinges against and is thoroughly broken up by said rotating agitator vanes prior to dropping on said first spreader surface and in part baffling therefrom across the chamber to said second spreader surface so that all descending particles become diffused into said flame for calcination by the heat thereof, a riser passage communicating with the lower portion of said combustion chamber and serving to conduct the gaseous combustion products upwardly therefrom, and means at the furnace bottom for removing the calcined material particles which drop out of the flame gases during passage of same through the combustion chamber and into said riser passage.

HANS V. PEDERSEN.

REFERENCES CITED

The following references are of record in the file of this patent:

UNITED STATES PATENTS

| Number | Name | Date |
|---|---|---|
| 371,715 | Sonnet | Oct. 18, 1887 |
| 1,158,371 | Carnie | Oct. 26, 1915 |
| 1,561,393 | Yung | Nov. 10, 1925 |
| 1,777,993 | Coley | Oct. 7, 1930 |
| 2,412,286 | Pedersen | Dec. 10, 1946 |

FOREIGN PATENTS

| Number | Country | Date |
|---|---|---|
| 6,262 | Great Britain | 1864 |
| 7,622 | Great Britain | Feb. 4, 1904 |
| 15,115 | Great Britain | Sept. 25, 1889 |